United States Patent
Morishita et al.

(10) Patent No.: US 6,504,587 B1
(45) Date of Patent: Jan. 7, 2003

(54) LIQUID CRYSTAL DISPLAY DEVICE IN WHICH THE INNER FRAME HAVING SIDEWALL

(75) Inventors: Shunsuke Morishita, Mobara (JP); Yasuyuki Mishima, Mobara (JP); Tatsuyuki Fumikura, Mobara (JP)

(73) Assignees: Hitachi, Ltd., Tokyo (JP); Hitachi Engineering Co., Ltd., Mobara (JP)

( * ) Notice: Subject to any disclaimer, the term of this patent is extended or adjusted under 35 U.S.C. 154(b) by 0 days.

(21) Appl. No.: 09/332,879

(22) Filed: Jun. 15, 1999

(30) Foreign Application Priority Data

Jun. 17, 1998 (JP) .......................................... 10-169751

(51) Int. Cl.[7] ..................... G02F 1/1333; G02F 1/1335; G02F 1/1343
(52) U.S. Cl. ............................ 349/58; 349/61; 349/141
(58) Field of Search ............................. 349/58, 61, 62, 349/141, 26, 31

(56) References Cited

U.S. PATENT DOCUMENTS

| | | | | |
|---|---|---|---|---|
| 5,432,626 A | * | 7/1995 | Ssuga et al. | 359/83 |
| 5,659,376 A | * | 8/1997 | Uehara et al. | 349/58 |
| 5,710,607 A | * | 1/1998 | Iwamoto et al. | 349/660 |
| 5,739,880 A | * | 4/1998 | Suzuki et al. | 349/110 |
| 5,838,401 A | * | 11/1998 | Uehara | 349/58 |
| 5,889,623 A | * | 3/1999 | Ueda et al. | 359/819 |
| 6,160,349 A | * | 12/2000 | Nagai | 315/85 |

* cited by examiner

Primary Examiner—Toan Ton
Assistant Examiner—Mike Qi
(74) Attorney, Agent, or Firm—Antonelli, Terry, Stout & Kraus, LLP (57) ABSTRACT

A liquid crystal display device includes a liquid crystal display panel having a liquid crystal layer sandwiched between a pair of upper and lower substrates, an illuminating light source disposed behind the liquid crystal display panel, an upper case made of metal having a sidewall bent back from a periphery of a front portion thereof and a window approximately corresponding to a display area of the liquid crystal display panel, a lower case made of resin for housing the illuminating light source in a recess thereof, and an inner frame made of metal having an opening for allowing light from the illuminating light source to be directed toward the liquid crystal display panel and interposed between the liquid crystal display panel and the lower case, the upper case and the lower case being clamped together after stacking the liquid crystal display panel, the inner frame and the illuminating light source in the order named between the upper case and the lower case.

10 Claims, 10 Drawing Sheets

LIQUID CRYSTAL DISPLAY DEVICE IN WHICH THE INNER FRAME HAVING SIDEWALL

BACKGROUND OF THE INVENTION

The present invention relates to a liquid crystal display device. A liquid crystal display panel employed in the liquid crystal display device comprises a pair of opposed substrates sealed along their peripheries to form an envelope for a layer of liquid crystal material and a plurality of electrodes for defining pixels on an inner surface of at least one of said pair of opposed substrates. Each pixel has a function of controlling the amount of light passing therethrough.

In general, the liquid crystal display devices are known which comprise a liquid crystal display panel using a pair of transparent substrates and a backlight disposed behind the liquid crystal display panel such that images are produced by controlling the amount of light passing through the liquid crystal display panel from the backlight.

The backlight is housed in a frame made of resin (hereinafter referred to as a lower case). The liquid crystal display panel is placed on the lower case so that the liquid crystal display panel is illuminated by the backlight.

The lower case serves mainly to house the backlight, supports the liquid crystal display panel and serves as a mask for projecting light from the backlight onto an area for displaying images of the liquid crystal display panel (hereinafter referred to as a display area).

Such a technique is disclosed in U.S. Pat. No. 5,432,626 (Application No. 29,622) issued on Jul. 11, 1995, for example, which employs a case for housing a backlight and an intermediate frame interposed between the case and a liquid crystal display panel.

But with a tendency toward large-sized display area, there arises a problem with the prior art liquid crystal display device that the mechanical strength of the lower case needs to be increased for housing a large-sized backlight and consequently the thickness of the lower case is required to be increased. This increases the width of the non-useful display area at the borders of the liquid crystal display panel (hereinafter referred to as a border area).

As explained above, the lower case supports the liquid crystal display panel and serves as a mask for projecting light from the backlight onto a display area of the liquid crystal display panel. With this structure, there is a possibility that shading occurs at the peripheries of the display area of the liquid crystal display panel viewed from the observer side.

Since the thickness of portions of the lower case serving as a mask is relatively greater, the portions block the light from the backlight and cause the shading at the peripheries at the display area of the liquid crystal display panel viewed from the observer side.

SUMMARY OF THE INVENTION

It is an object of the present invention to solve the above problem with the prior art and to provide a liquid crystal display device capable of securing a sufficient mechanical strength of the lower case without increasing the border area of the large-sized liquid crystal display panel.

It is another object of the present invention to provide a liquid crystal display device free from occurrence of the shading at the peripheries of the display area of the liquid crystal display panel viewed from the observer side.

The above-mentioned objects and novel features of the present invention will become more apparent by reference to the following description taken in conjunction with the accompanying drawings.

For achieving the aforesaid object, a liquid crystal display device according to an embodiment of the present invention comprises: a liquid crystal display panel having a liquid crystal layer sandwiched between a pair of upper and lower substrates, an illuminating light source disposed behind the liquid crystal display panel, an upper case made of metal having a sidewall bent back from a periphery of a front portion thereof and a window approximately corresponding to a display area of the liquid crystal display panel, a lower case made of resin for housing the illuminating light source in a recess thereof, and an inner frame made of metal having an opening for allowing light from the illuminating light source to be directed toward the liquid crystal display panel and interposed between the liquid crystal display panel and the lower case, the upper case and the lower case being clamped together after stacking the liquid crystal display panel, the inner frame and the illuminating light source in the order named between said upper case and said lower case.

For achieving the aforesaid object, a liquid crystal display device according to another embodiment of the present invention comprises: a liquid crystal display panel having a liquid crystal layer sandwiched between a pair of upper and lower substrates, an illuminating light source disposed behind the liquid crystal display panel, an upper case made of metal having a sidewall bent back from a periphery of a front portion thereof and a window approximately corresponding to a display area of the liquid crystal display panel, a lower case made of resin for housing the illuminating light source in a recess thereof, an inner frame made of metal having an opening for allowing light from the illuminating light source to be directed toward the liquid crystal display panel and interposed between the liquid crystal display panel and the lower case, and a transparent plate fitted within the opening in the inner frame, the upper case and the lower case being clamped together after stacking the liquid crystal display panel, the inner frame and the illuminating light source in the order named between the upper case and the lower case.

The construction of the present invention enables the metal inner frame to reinforce the lower case and consequently eliminates the need for increasing the thickness of the lower case, namely avoids the increase in the so-called border area of the liquid crystal display panel.

Employment of metal for the inner frame makes the thickness of the inner frame thin. In directing light from the backlight by the inner frame only onto the display area of the liquid crystal display panel, it is possible to prevent occurrence of the shading at the peripheries of the display area of the liquid crystal display panel when it is viewed from the observer's side by accurately positioning the edge of the opening of the inner frame.

BRIEF DESCRIPTION OF THE DRAWINGS

In the accompanying drawings, in which like reference numerals designate similar components throughout the figures, and in which.

DETAILED DESCRIPTION OF THE PREFERRED EMBODIMENTS

The embodiments of the liquid crystal display device in accordance with the present invention will now be described in detail with reference to the accompanying drawings.

Embodiment 1
Structure of the Liquid Crystal Display Device

The liquid crystal display device of this embodiment is an active matrix liquid crystal display device of a so-called horizontal electric field type (commonly called an in-plane switching (IPS) type, see Japanese Patent Publication No. Sho 63-21907 and U.S. Pat. No. 4,345,249) and its structure is shown in FIG. 2.

Figure 2:
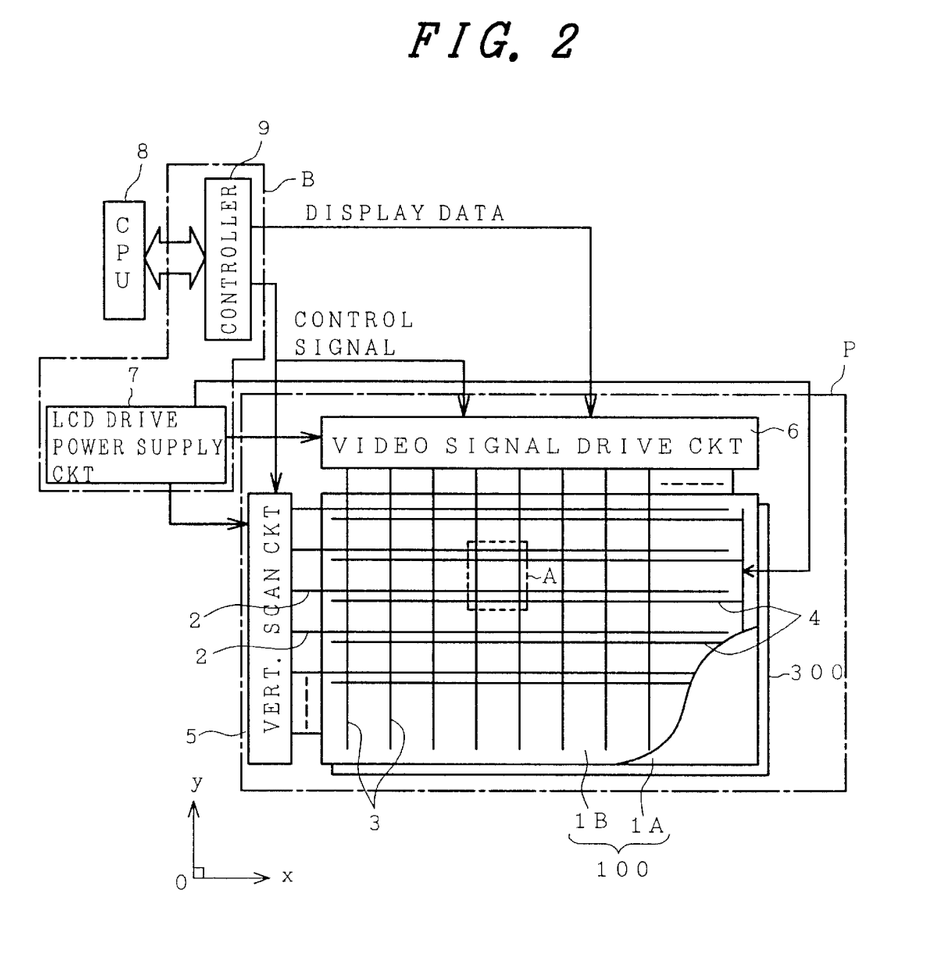
FIG. 2 is a diagram showing a configuration of a liquid crystal display panel and its drive circuit used for an embodiment of a liquid crystal display device in accordance with the present invention.

A liquid crystal display panel 100 shown in FIG. 2 has a display section comprised of a plurality of pixels arranged in a matrix and each pixel is structured such that it can control or modulate the amount of light passing therethrough from a backlight unit 300 disposed behind the liquid crystal display panel 100 independently of other pixels.

Modulation of the amount of light at each pixel is performed by the in-plane switching (IPS) method which makes an electric field in a layer of liquid crystal material sandwiched between a pair of opposed transparent substrates 1A,1B in parallel with the transparent substrates IA,LB.

This type of the liquid crystal display panel 100 provides a sharp image even when it is viewed at a large angle from the normal to its display surface and consequently it is known for its wide viewing angles.

Scanning signal lines 2 and reference signal lines 4 extend in an x direction (a row direction) and are arranged in parallel with each other in a y direction (a column direction) on an inner surface on the liquid crystal layer side of the one substrate 1A of the opposing transparent substrates 1A, 1B with a layer of liquid crystal material therebetween.

In FIG. 2, scanning signal lines 2 and reference signal lines 4 are alternately arranged on the transparent substrate 1A, such as, from the top of the transparent substrate 1A, a scanning signal line 2, a reference signal line 4 adjacent to the scanning signal line 2, another scanning signal line 2 spaced a relatively large distance from the reference signal line 4, another reference signal line 4 closely spaced from the another scanning signal line 2, and so on.

The video signal lines 3 extend in the y direction and are arranged in parallel with each other in the x direction, electrically insulated from the scanning signal lines 2 and the reference signal lines 4.

A unit pixel is formed in a relatively large rectangular area enclosed by the scanning signal lines 2, the reference signal lines 4 and the video signal lines 3, and a plurality of unit pixels are arranged in a matrix to form a display area. The pixels will be explained in detail subsequently.

The liquid crystal display panel 100 is provided with external circuits such as a vertical scanning circuit 5 and a video signal drive circuit 6. The vertical scanning circuit 5 supplies scanning signals (voltages) to each of the scanning signal lines 2 successively and the video signal circuit 6 supplies video signals (voltages) to the video signal lines 3 in synchronism with the scanning signals.

The vertical scanning circuit 5 and the video signal drive circuit 6 receive supply voltages from a liquid crystal drive power supply circuit 7 and receive display data and control data respectively separated by a controller 9 from video information from CPU 8. Specially for the liquid crystal display panel 100, the reference signal lines 4 are employed and are supplied with the reference voltage signal from the liquid crystal drive power supply circuit 7.

Overall Structure of the Liquid Crystal Display Device

Figure 1:
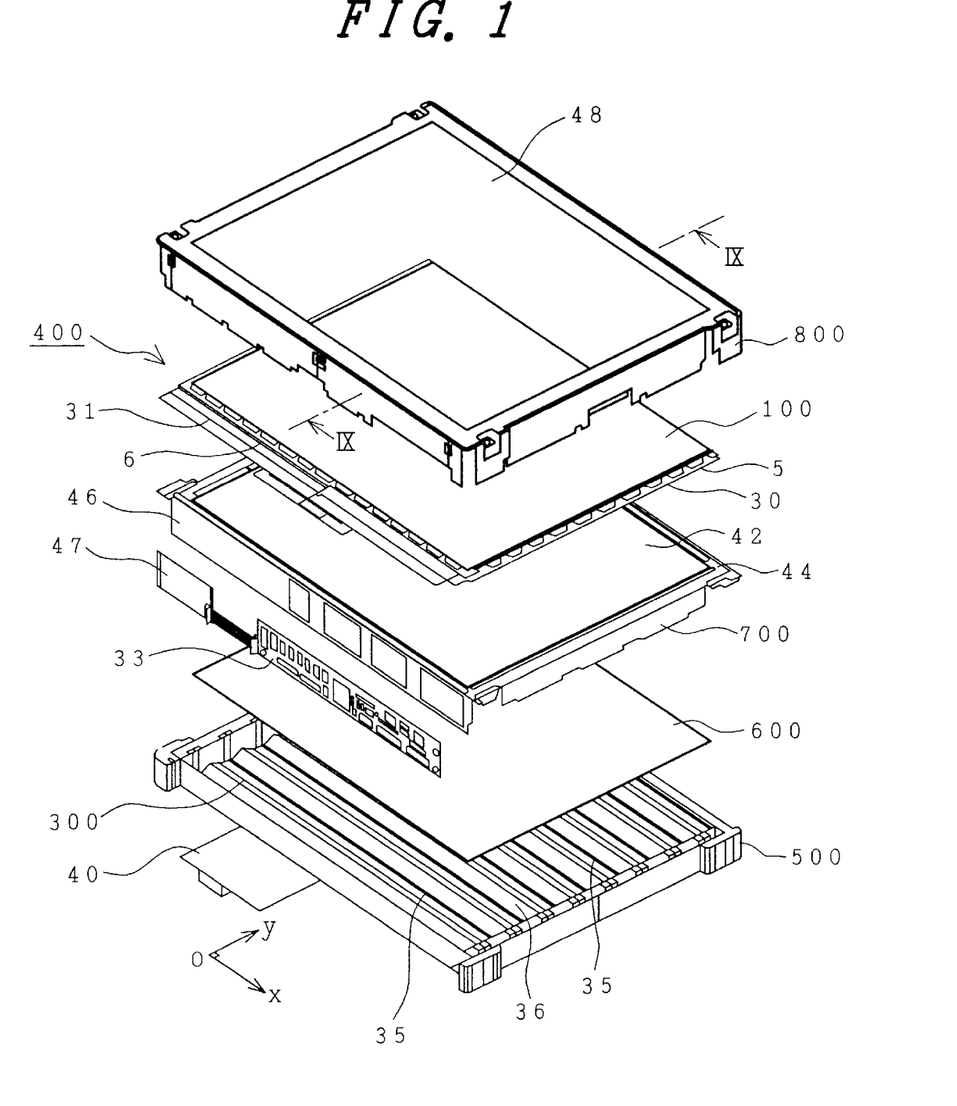
FIG. 1 is an exploded perspective view of an embodiment of the liquid crystal display device in accordance with the present invention.

FIG. 1 is an exploded perspective view of an embodiment of the liquid crystal display device in accordance with the present invention. The liquid crystal display device of FIG. 1 is divided into five main sections, a liquid crystal display panel module 400, a backlight unit 300, a lower case 500, an inner frame 700 and an upper frame 800, which are assembled into a module. These sections will be explained below.

Liquid Crystal Display Panel Module

The liquid crystal display panel 400 corresponds to a section enclosed by a dot-and-dash line P in FIG. 2 and comprises the liquid crystal display panel 100, the vertical scanning circuit 5 comprised of a plurality of semiconductor ICs mounted at the peripheries of the liquid crystal display panel 100, the video signal drive circuit 6, a flexible gate-circuit board 30 (see FIG. 1) connected to the input terminals for the vertical scanning circuit 5 and a flexible drain-circuit board 31 (see FIG. 1) connected to the input terminals for the video signal drive circuit 6.

Outputs from a controller circuit board 33 which will be explained in detail subsequently are inputted to the vertical scanning circuit 5 and the video signal drive circuit 6 mounted on the liquid crystal display panel 100 via the gate-circuit board 30 and the drain-circuit board 31, respectively, and the outputs of the two circuits are inputted to the scanning signal lines 2 and the video signal lines 3 of the liquid crystal display panel 100, respectively.

The display area of the liquid crystal display panel 100 is formed of a large number of pixels arranged in a matrix as explained above, and FIG. 3 is an enlarged plan view of one of the pixels which corresponds to an area A enclosed by broken lines in FIG. 2. FIG. 4 is a cross-sectional view of the pixel taken along line IV—IV in FIG. 3, FIG. 5 is a cross-sectional view of the pixel taken along line V—V in FIG. 3, and FIG. 6 is a cross-sectional view of the pixel taken along line VI—VI in FIG. 3.

Figure 3:
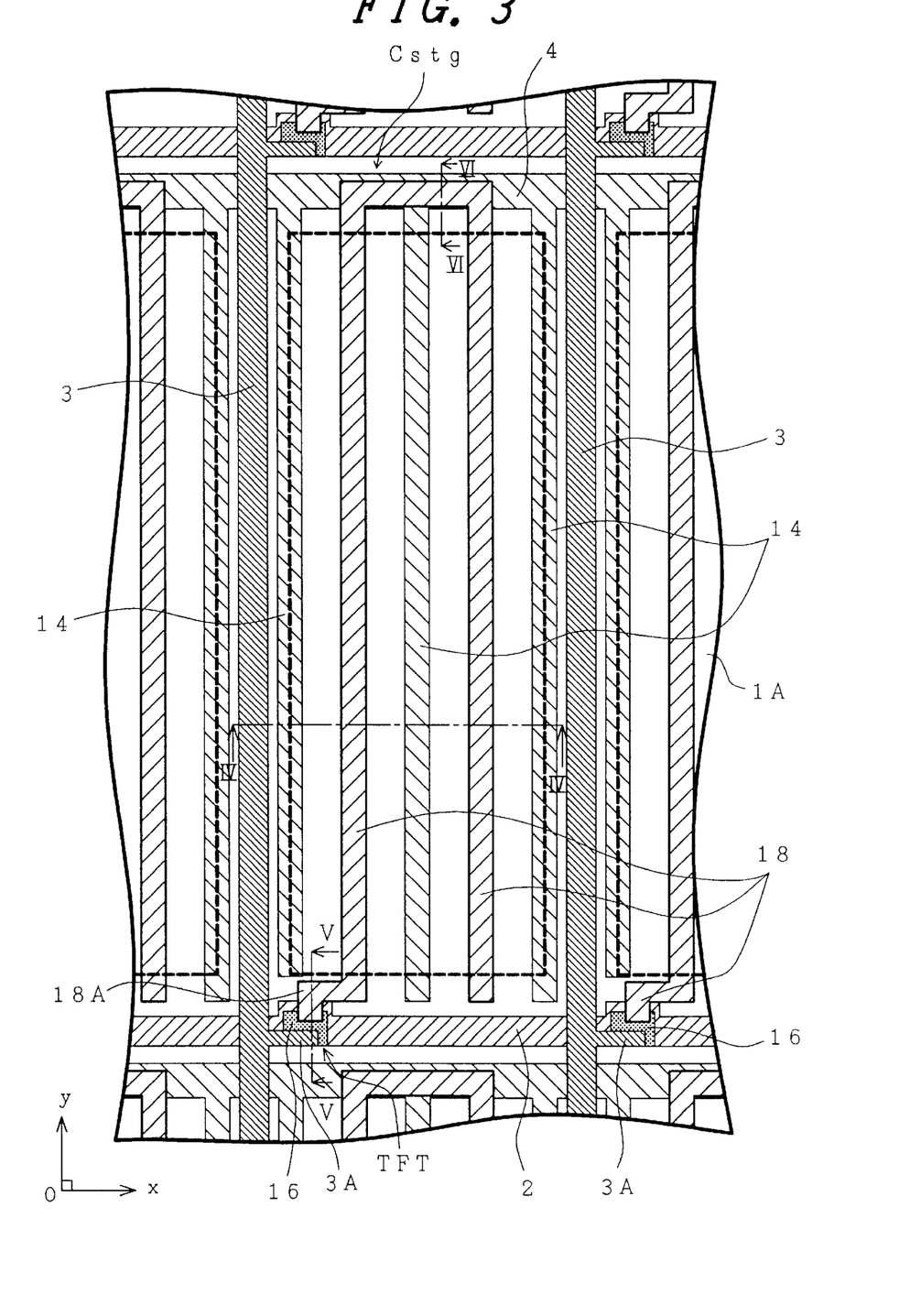
FIG. 3 is a plan view of an example of a pixel in the liquid crystal display device of the present invention.
Figure 4:
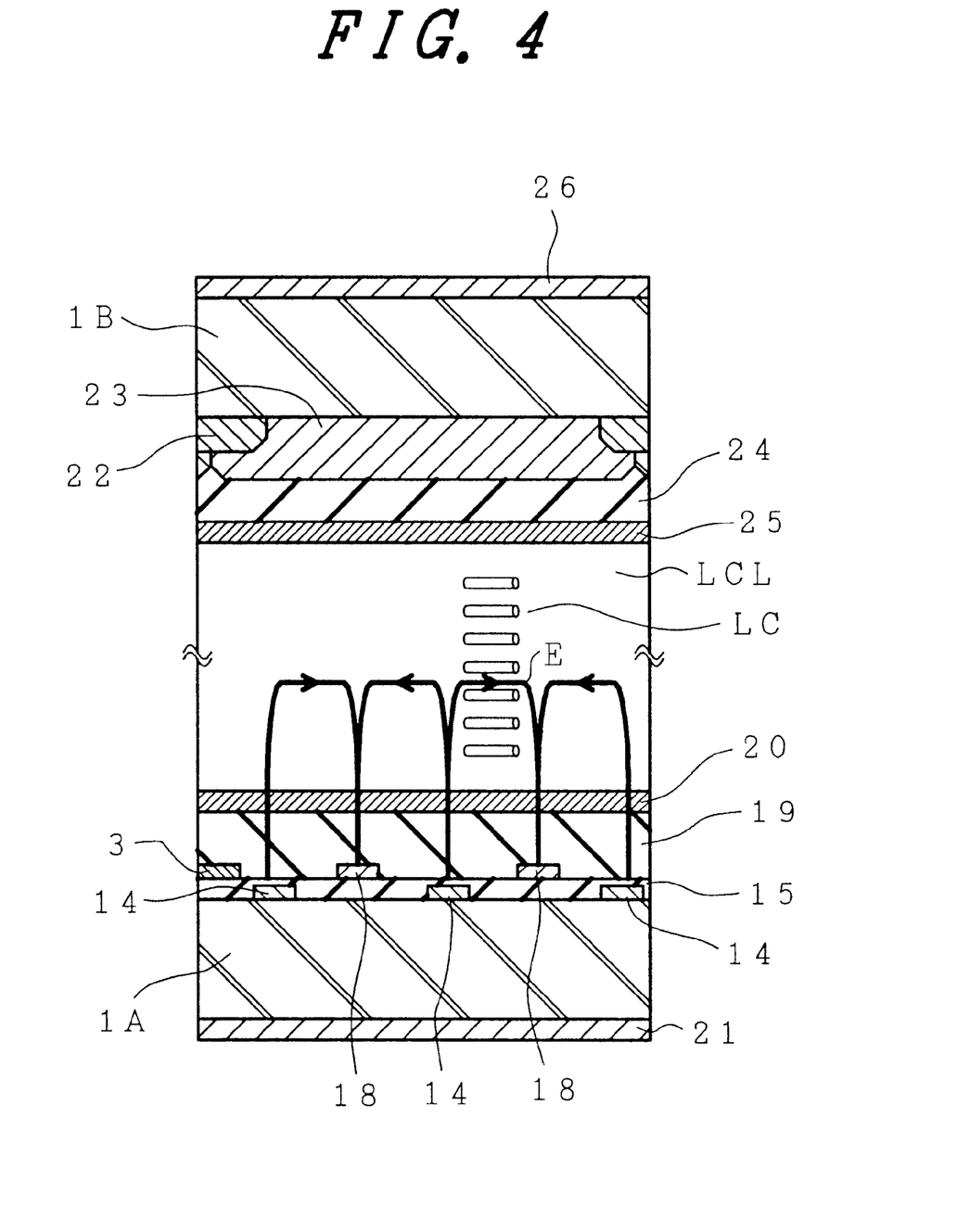
FIG. 4 is a cross-sectional view taken along line IV—IV of FIG. 3.

In FIG. 3, the reference signal line 4 extend in the x direction on the major surface of the transparent substrate 1A and the scanning signal line 2 are spaced a relatively large distance from the reference signal line 4 in the negative y direction and extend in parallel with the reference signal line 4.

Three reference electrodes 14 are formed integrally with the reference signal line 4. Two of the three reference electrodes 14 extend close to and along a pair of adjacent video signal lines 3 defining one pixel area, respectively, in the negative y direction to the vicinity of the scanning signal lines 2, and the other one of the three reference electrodes 14 extend in parallel with and between the two reference electrodes 14.

Figure 5:
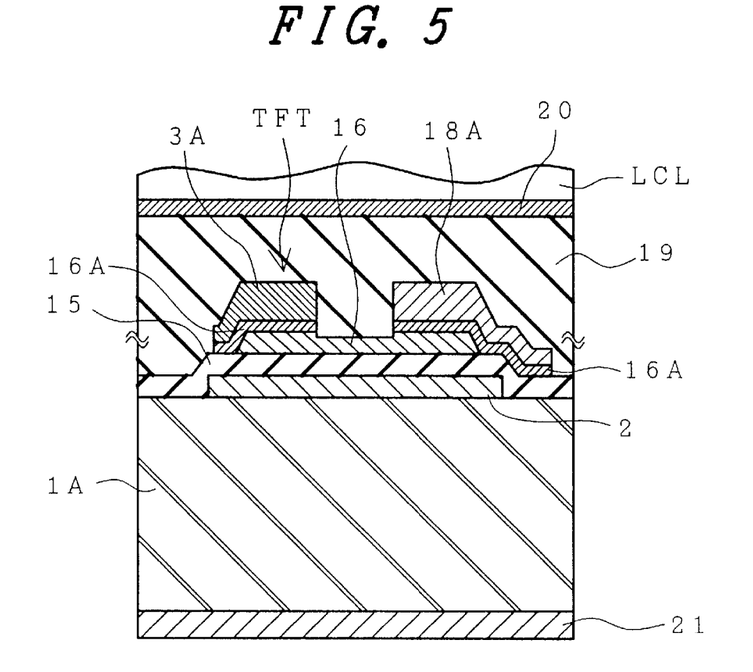
FIG. 5 is a cross-sectional view taken along line V—V of FIG. 3.
Figure 6:
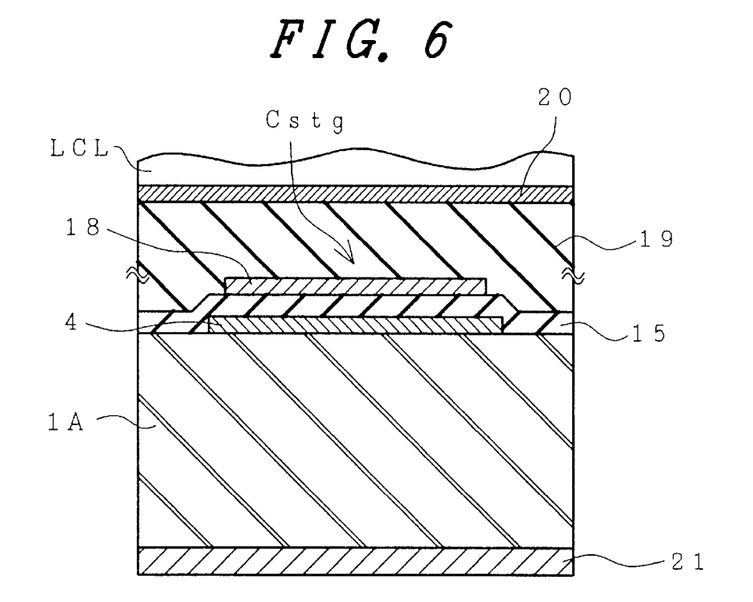
FIG. 6 is a cross-sectional view taken along line VI—VI of FIG. 3.

An insulating film 15 made of silicon nitride, for example, is formed to cover the surface of the transparent substrate 1A and the scanning signal lines 2, the reference signal lines 4 and the reference electrodes 14 formed on the transparent substrate 1A (see FIGS. 4, 5 and 6). The insulating film 15 serves as an interlayer insulating film between the video signal lines 3 and the scanning signal lines 2 or the reference signal lines 4 at their intersections, serves as a gate insulating film at areas forming a thin film transistor TFT and serves as a dielectric at areas forming a storage capacitor Cstg.

As shown in FIG. 5, initially a semiconductor layer 16 is formed at an area for forming a thin film transistor TFT on the insulating film 15. The semiconductor film 16 is made of amorphous silicon, for example, and is disposed on the scanning signal line 2 near the video signal line 3, and consequently a portion of the scanning signal line 2 serves as a gate electrode of the thin film transistor TFT also.

As shown in FIG. 3, a plurality of video signal lines extending in the y direction are arranged in the x direction the insulating film 15. A drain electrode 3A is formed integrally with the video signal line 3 such that the drain electrode 3A extends on a portion of the surface of the semiconductor layer 16 of the thin film transistor TFT.

A display electrode 18 is formed on the surface of the insulating film 15 in the pixel area. The display electrode 18 runs between the reference electrodes 14. One end of the display electrode 18 serves as a source electrode 18A of the thin film transistor TFT, from there the display electrode 18 extends in the positive y direction, then extends on the reference signal line 4 in the x direction and then extends in the negative y direction terminating in the other end of the display electrode 18, to form a square letter U.

A portion of the display electrode 18 overlapping the reference signal lines 4 forms a storage capacitor Cstg with the reference signal lines 4 with the insulating film 15 therebetween serving as a dielectric. The storage capacitor provides the effect of storing image information in the display electrode 18 longer after switching off of the thin film transistor TFT, for example.

The surface of the semiconductor layer 16 forming an interface with the drain electrode 3A and the source electrode 18A of the thin film transistor TFT is doped with phosphorus to form heavily doped layers 16A and to obtain ohmic contacts at the drain electrode 3A and the source electrode 18A. In this case, initially the heavily doped layer 16A is formed over the entire surface area of the semiconductor layer 16, and the drain electrode 3A and the source electrode 18A are formed on the heavily doped layer 16A. The heavily doped layer 16A is patterned by etching away the parts of the heavily doped layer 16A not covered by the drain electrode 3A and the source electrode 18A serving as masks.

A protective film 19 made of silicon nitride, for example, is formed on the thin film transistor TFT, the video signal lines 3, the display electrodes 18 and the insulating film 15 as shown in FIGS. 4, 5 and 6, and then a liquid crystal molecule orientation film 20 is formed on the protective film 19 to complete the transparent substrate 1A of the liquid crystal display panel 100.

A polarizer 21 is attached to the surface of the transparent substrate 1A on the side opposite from a layer of liquid crystal material LCL.

A light-blocking film 22 is formed on portions of the transparent substrate 1B on the side thereof facing the liquid crystal layer LCL which correspond to borders around each pixel area as shown in FIG. 4. The light-blocking film 22 has functions of preventing light from illuminating the thin film transistor TFT directly and improving the display contrast. The light-blocking film 22 is configured such that a window indicated by broken lines in FIG. 3 defines a substantial pixel area.

A color filter 23 is formed to cover the window in the light-blocking film 22 as shown in FIG. 4. Any two color filters 23 in two pixel areas adjacent in the x direction in FIG. 3, respectively, have two colors different from each other, and have borders between the two color filters on the light-blocking film 22. A planarizing film 24 made of resin, for example, is formed on the color filters 23 and a liquid crystal molecule orientation film 25 is formed on the planarizing film 24.

A polarizer 26 is attached to the surface of the transparent substrate 1B on the side thereof opposite from the liquid crystal layer LCL.

Backlight

Returning to FIG. 1, a backlight unit 300 is disposed behind the liquid crystal display panel module 400. This backlight unit 300 is of the so-called head-on type, and comprises a plurality (eight in FIG. 1) of cold cathode lamps 35 each extending in the x direction and arranged in the y direction and a reflector 36 for directing light from the cold cathode lamps 35 toward the liquid crystal display panel module 400. The surface of the reflector 36 is corrugated in the direction of the arrangement of the cold cathode lamps 35 (the y direction) as shown in detail in FIG. 7 such that its portions seating the respective cold cathode lamps 35 are recessed concavely and its portions between the respective cold cathode lamps 35 project to form sharp tips in cross-section such that all the light rays from the respective cold cathode lamps 35 are directed toward the liquid crystal display panel module 400 efficiently.

Figure 7:
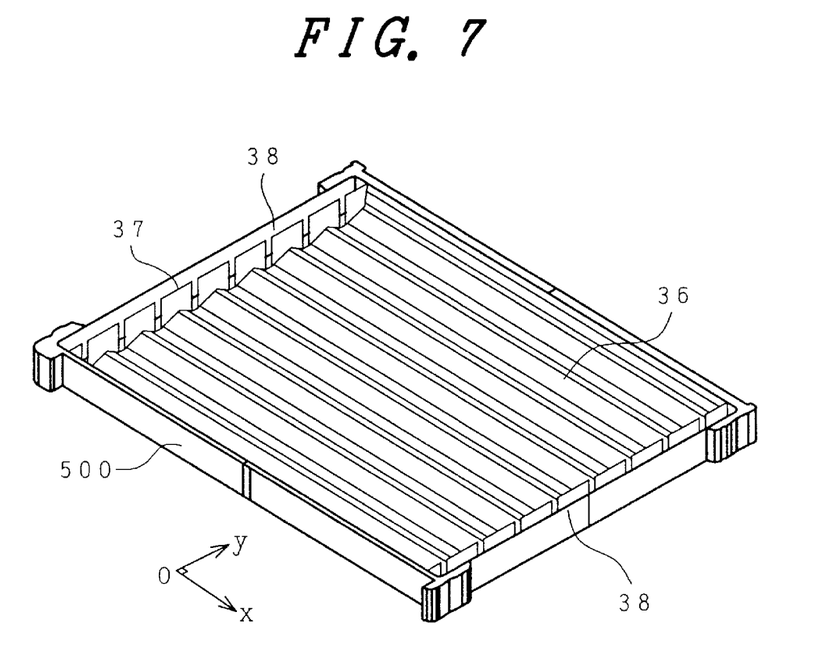
FIG. 7 is a perspective view of an example of a backlight unit in the liquid crystal display device of the present invention.

The reflector 36 is provided with sideboards 37 at its sides perpendicular to the longitudinal axes of the cold cathode lamps 35, and both ends of the cold cathode lamps 35 are fitted into the slits 38 formed in the sideboards 37 to prevent the movement of the cold cathode lamps 35 in the direction of their arrangement.

Lower Case

A lower case 500 constitutes a part of an outer frame of the liquid crystal display device assembled as a module and houses the backlight unit 300. The lower case 500 is in the form of a box having a bottom and sidewalls and the top ends of the sidewalls are configured such that they support a light diffusing plate 600 disposed to cover the backlight unit 300.

The light diffusing plate 600 diffuses the light from the cold cathode lamps 35 of the backlight unit 300 to project light uniformly toward the liquid crystal display panel module 400. The thickness of the lower case 500 is made relatively small because the resultant reduction of the mechanical strength of the lower case 500 is compensated for by an inner frame 700 to be described subsequently.

A DC/AC inverter circuit board 40 is attached to the rear surface of the lower case 500, and is connected to the terminals of the cold cathode lamps 35 to provide a supply voltage to the cold cathode lamps 35 of the backlight unit 300.

Inner Frame

An inner frame 700 is disposed between the liquid crystal display panel module 400 and the light diffusing plate 600. The inner frame 700 is made of a metal plate of relatively small thickness, and has an opening 42 corresponding to a display area of the liquid crystal display panel module 400.

The inner frame 700 has functions of pressing the light diffusing plate 600 against the lower case 500 and supporting the liquid crystal display panel module 400.

The positioning spacers 44 made of resin and having an L-shaped cross-section, for example, are attached to positions on the inner frame 700 corresponding to the corners of the liquid crystal display panel 100 of the module 400 to be mounted on the inner frame 700 such that the liquid crystal display panel 100 is positioned accurately with respect to the inner frame 700.

Figure 8:
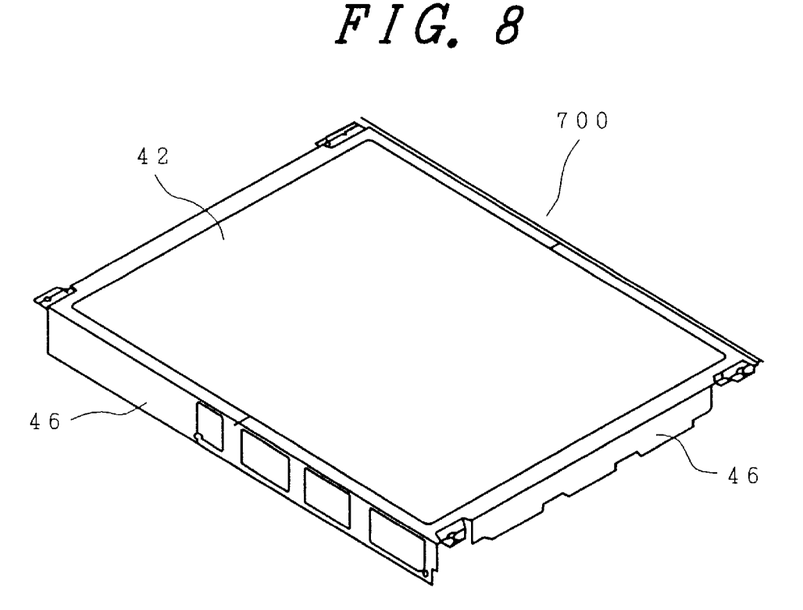
FIG. 8 is a perspective view of an example of an inner frame in the liquid crystal display device of the present invention.

As shown in detail in FIG. 8, the inner frame 700 has sidewalls 46 integrally formed therewith, that is, is in the form of a general box made of metal and having the opening 42 in its bottom.

The inner frame 700 is structured such that it is fitted over the lower case 500 with the light diffusing plate 600 interposed therebetween, namely, the inner frame 700 is fitted over the lower case 500 such that the inner surface of the sidewalls 46 of the inner frame 700 face the outer surface of the sidewalls of the lower case 500.

The inner metal frame 700 of this structure forms a frame structure in combination with the lower case 500 such that the mechanical strength of the frame structure is increased without increasing the thickness of the lower case 500. Even if the mechanical strength of each of the inner frame 700 and the lower case 500 is not sufficient enough, when the inner frame 700 is fitted over the lower case 500 as described above, the mechanical strength of the combination of the two is improved, especially the strength against twisting around the diagonals of the box structure is increased. This provides an advantage of securing the sufficient mechanical strength of the liquid crystal display device without increasing the border areas of the liquid crystal display panel.

The mechanical strength of the inner frame 700 by itself is increased compared with a substantially flat inner frame without any sidewalls such that handling of the inner frame 700 is facilitated in early stages of the module assembly.

Incidentally, in this embodiment a control circuit board 33 and a DC/DC converter circuit board 47 are juxtaposed at portions of the sidewalls 46 of the inner frame 700, namely, they are arranged in a plane perpendicular to the display surface of the liquid crystal display panel module 400 to reduce the border areas.

In this case, the control circuit board 33 is connected to the flexible gate-circuit board 30 and the flexible drain-circuit board 31 attached to the liquid crystal display panel module 400 and the drain-circuit board 31 is bent to provide the above arrangement.

The control circuit board 33 and the DC/DC converter circuit board 47 correspond to a section B enclosed by dot-and-dash lines in FIG. 2.

Incidentally, with this structure, electromagnetic radiation from the control circuit board 33 is prevented by the sidewalls 46 of the inner frame 700 from being introduced into other electronic components.

In the above embodiment the inner frame 700 is in the form of a box, but the inner frame 700 need not be a perfect box, it may be a frame having a sidewall formed in at least one of its four sides. The inner frame 700 is provided with a bent portion integrally formed with it, which improves its mechanical strength.

Upper Frame

An upper frame 800 presses the liquid crystal display panel module 400, the inner frame 700 and the light diffusing plate 600 against the lower case 500, and forms an outer frame of the module of the liquid crystal display device with the lower case 500.

The upper frame 800 made of metal is of the shape of a general box having an opening (a display window) 48 corresponding to the display area of the liquid crystal display panel module 400 and is clamped to the lower case 500 a by engagement with it, for example. The upper frame 800 also has a function of electrostatic shielding.

Cross-sectional Configuration of the Module

Figure 9:
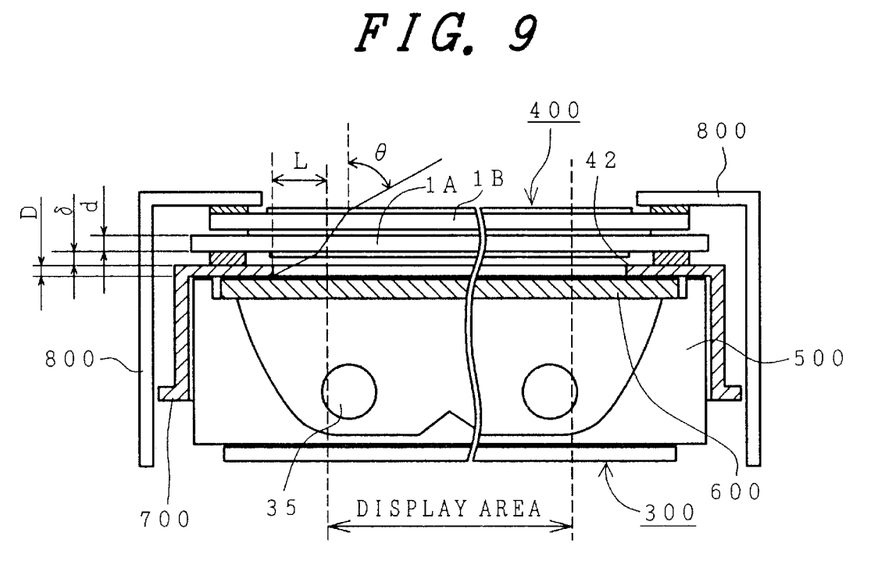
FIG. 9 is a cross-sectional view taken along line IX—IX of FIG. 1 for explaining of the advantages of the present invention.

FIG. 9 is a cross-sectional view of the liquid crystal display device taken along line IX—IX in FIG. 1. It is apparent from FIG. 9 that the inner frame 700 also has a function of a mask for projecting the light from the backlight unit 300 onto the display area of the liquid crystal display panel module 400 and reducing the amount of light leaking into the areas around the display area, in addition to supporting the liquid crystal display panel module 400. For this purpose, the contour of the opening 42 in the inner frame 700 needs to be positioned accurately with respect to the liquid crystal display panel module 400.

In this embodiment, as explained above, the thickness of the inner frame 700 is relatively small, and consequently this embodiment provides the advantages that setting of the inner frame 700 is accurately performed and consideration of influences by the thickness of the inner frame 700 is not required in setting of the inner frame 700.

Figure 10:
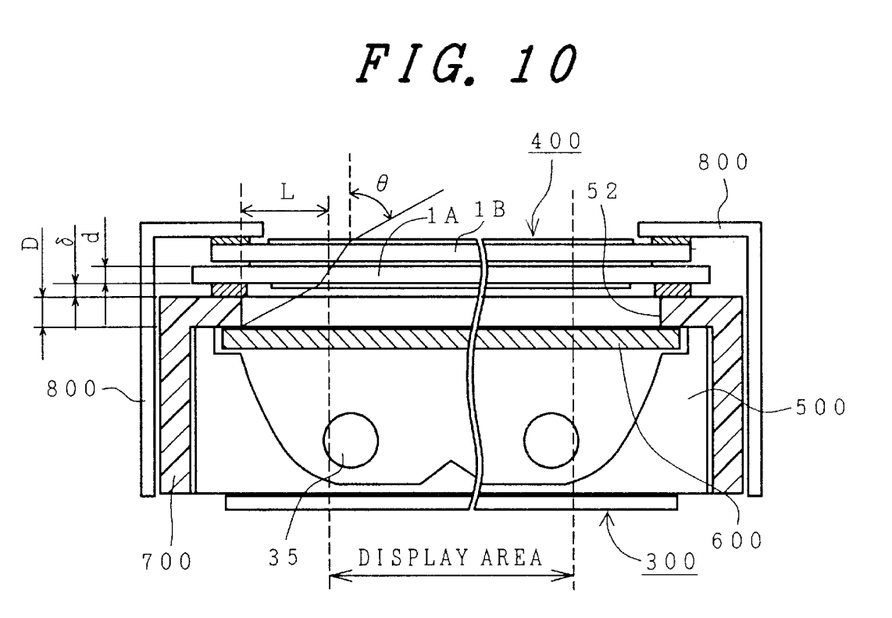
FIG. 10 is an illustration for explaining the disadvantages of the prior art.

FIG. 10 is a cross-sectional view of a liquid crystal display panel module in which the thickness of the inner frame 700 is made greater than that of the inner frame 700 shown in FIG. 9. It is apparent from FIG. 10 that the masking function of the lower case 500 is greatly influenced by its thickness and consequently the masking function is not sometimes performed sufficiently due to an inappropriate position of the contour of the opening 52 in the lower case 500 and the shading occurs around the display area of the liquid crystal display panel 100 when viewed from the observer side.

In FIGS. 9 and 10, D denotes the thickness of the inner frame, $\delta$ is a spacing between the inner frame and the transparent substrate 1A, which is determined by a cushion layer, for example, d is the thickness of the transparent substrate 1A, and L is a distance from the edge of the opening of the inner frame to the edge of the display area.

Prior art liquid crystal display panels have small viewing angles, and consequently there is a problem that gray scale images viewed at off-normal angles differ from those by normal viewing.

To solve this problem, the present inventors have adopted the above-explained in-plane switching for the liquid crystal display panel, but found that, since the liquid crystal display panel of the in-plane switching type has wide viewing angles, the shading around the display area caused by the inner frame becomes pronounced when viewed at angles near $\theta$ indicated in FIGS. 9 and 10.

In FIGS. 9 and 10, consider a ray which leaves the display surface of the liquid crystal display panel 100 at an angle θ with respect to the normal to the display surface and which also passes the edge of the display area of the panel 100, if the length L is chosen such that a ray path formed by tracing the ray backward is not intercepted by the inner frame, the shading is not observed when the liquid crystal display panel is viewed at angles within the angle θ with respect to the panel normal.

It is desirable that the angle θ is as large as possible and the distance L is as short as possible, but the distance L increases with increase in the angle θ.

By tracing backward a ray which leaves the display surface of the panel 100 at an angle θ with respect to the display surface normal and also passes the edge of the its display area, it is found that adjustment of the total distance (D+σ+d) of the thickness D of the inner frame, the spacing σ and the thickness d of the transparent substrate 1A can reduce the distance L with the angle θ being fixed.

In this embodiment, the employment of the inner metal frame 700 enables reduction of the thickness D of the inner frame 700 and consequently reduction of the distance L without degrading the mechanical strength of the module.

In the liquid crystal display device of this embodiment, reduction of the thickness of the inner frame 700 enables the liquid crystal display panel module 400 to be disposed closer to the backlight unit 300 as shown in FIG. 9 and also provides an advantage that brightness of the display is increased.

Embodiment 2

Figure 11:
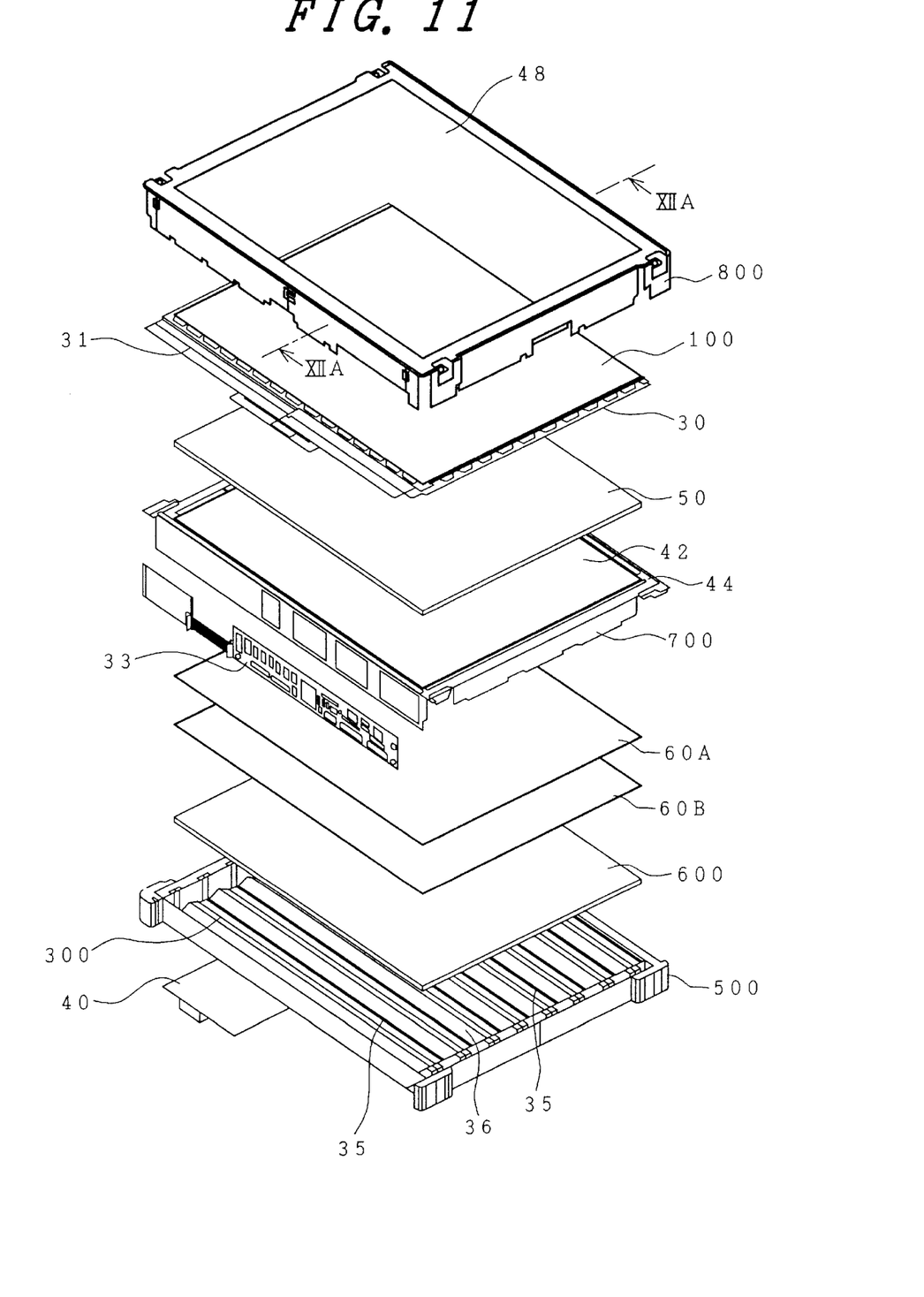
FIG. 11 is an exploded perspective view of another embodiment of the liquid crystal display device in accordance with the present invention.

FIG. 11 is an exploded perspective view of another embodiment of the liquid crystal display device in accordance with the present invention, and corresponds to FIG. 1. The same reference numerals as utilized in FIG. 1 designate corresponding portions in FIG. 11. The structure of the liquid crystal display device in this embodiment may be substantially the same as that of FIG. 1, except that there is a plate 50 (hereinafter referred to as a sag-proof plate) for prevention of sagging of the liquid crystal display panel module 400 disposed behind it. The sag-proof plate 50 is a transparent plate made of acrylic resin, for example.

The sag-proof plate 50 is positioned within the opening 42 in the inner frame 700, and is supported on the lower case 500 via light-collecting sheets 60A, 60B and the light diffusing plate 600.

Figure 12A:
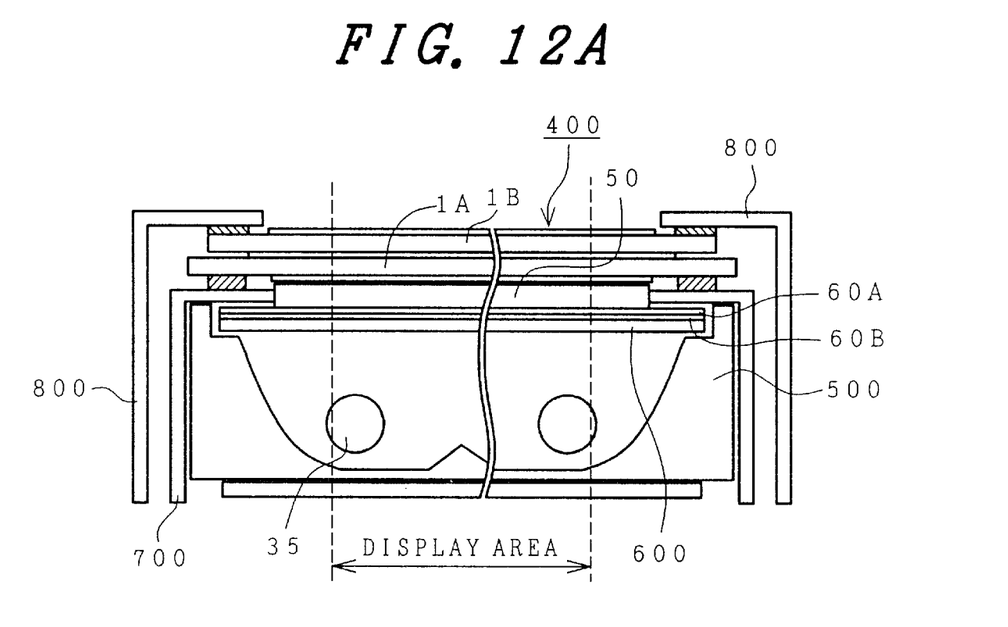
FIG. 12A is a cross-sectional view taken along line XIIA—XIIA of FIG. 11.

As shown in FIG. 12A, which is a cross-sectional view the liquid crystal display device taken along line XIIA—XIIA in FIG. 11, the light diffusing plate 600 is disposed to bridges the opening in the lower case 500, and the liquid crystal display panel module 400 is placed in contact with the light collecting sheet 60A positioned on the light diffusing plate 600. In this case, the sag-proof plate 50 is fitted within the opening 42 in the inner frame 700, and consequently is prevented from moving horizontally within the opening by the inner frame 700 and from moving vertically by the light diffusing plate 600, the light collecting sheets 60A, 60B and the liquid crystal display panel module 400, resulting in elimination of the need of a particular device for positioning the sag-proof plate 50.

With this structure of the liquid crystal display device, the rear surface of the liquid crystal display panel module 400 is pressed against the sag-proof plate 50 directly or with other optical components interposed therebetween such that the liquid crystal display panel exerts a force over at least the entire display area of the liquid crystal display panel toward the backlight unit 300. The sag-proof plate 50 solves a problem that the liquid crystal display panel easily sags due to its own weight, for example, since the area of the liquid crystal display panel module 400 is increased drastically, although its thickness is not increased proportionately, as explained in the above embodiment. The sag-proof plate 50 is supported on the lower case 500 serving as part of an outer frame of the liquid crystal display device (in the embodiment, via the light collecting sheets 60A, 60B and the light diffusing plate 600), and it prevents sagging in the liquid crystal display panel module 400 sufficiently if it has some rigidity.

Incidentally, in the above embodiment, the sag-proof plate 50 contact the entire display area of the liquid crystal display panel module 400 directly or indirectly, but it is not necessary that the sag-proof plate 500 is in area contact with the liquid crystal display panel module. For example, the sag-proof plate 500 may contact the display area of the liquid crystal display panel module 400 at several points for prevention of sagging, because it is sufficient that the liquid crystal display panel exerts a force over the display area of the liquid crystal display panel module 400 toward the backlight unit 300.

Figure 12B:
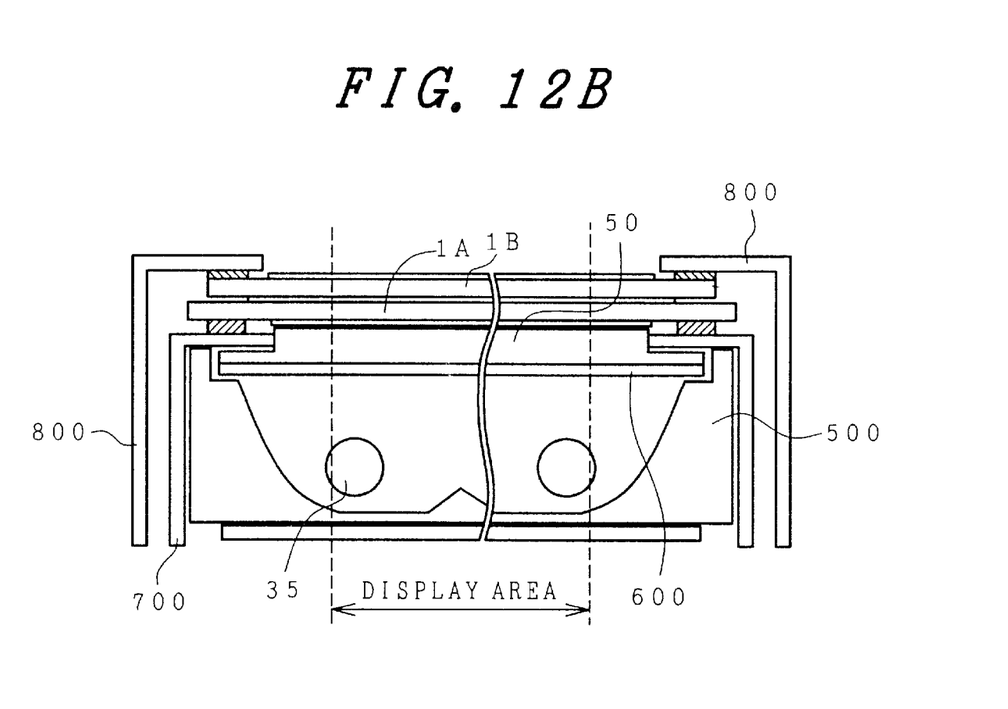
FIG. 12B is a cross-sectional view of a modification of FIG. 12A.

FIG. 12B is a cross-sectional view of a liquid crystal display device employing the sag-proof plate 50 of FIG. 12A with its ends modified. The sag-proof plate 50 is provided with steps at its ends such that its ends extend under the top portions of the inner frame 700 and onto the support portions of the lower case 500.

With this structure, forces exerted on the ends of the sag-proof plate 50 are opposed by the support portions of the lower case such that deformation of the light diffusing plate 600 is prevented.

Embodiment 3

Figure 13A:
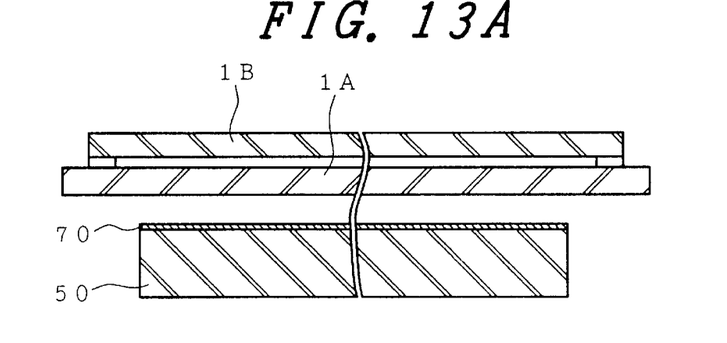
FIGS. 13A and 13B are cross-sectional views for explaining further modifications of the present invention, respectively.
Figure 13B:
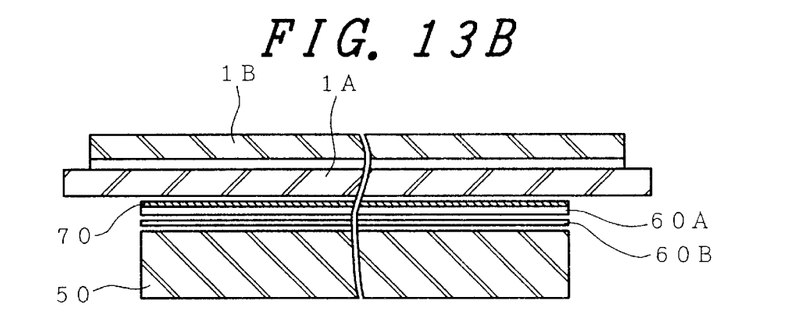

FIGS. 13A and 13B are schematic cross-sectional views for explaining modifications improved over the liquid crystal display device of Embodiment 2.

FIG. 13A illustrates a relationship between the sag-proof plate 50 and the transparent substrates 1A, 1B of the liquid crystal display panel module 400 in cross-section, and an electrically conductive transparent film 70 made of ITO (indium-tin-oxide), for example, is formed on at least an area of the sag-proof plate 50 facing the display area of the liquid crystal display panel module 400.

As described above, the liquid crystal display panel module 400 in the above embodiments is of the so-called in-plane switching type in which each pixel controls the light transmission through the liquid crystal layer by controlling electric fields approximately parallel with the major surface of the transparent substrates.

In this case, the electric fields are very weak, and are easily influenced by external fields, and therefore the transparent conductive film 70 is intended to serve as antistatic means. Especially, the liquid crystal display panel module 400 is disposed to oppose the sag-proof plate 50 directly or indirectly as described above, electrification by friction easily influences the electric fields for driving the liquid crystal display panel, and therefore it is very effective to provide the above antistatic means on the surface of the sag-proof plate 50.

For the same purpose, it is also effective to provide antistatic means such as this on the surface of the liquid crystal display panel module 400 on the side of the sag-proof plate 50.

Incidentally, external static electricity to enter easily the surface of the liquid crystal display panel module 400 on the observer's side, that is, the surface of the liquid crystal display panel module 400 on the side opposite from the backlight unit 300, and if antistatic means such as application of transparent conductive films is employed taken on this side, image display is not produced, and therefore antistatic means has been employed on this side.

FIG. 13B is a cross-sectional view of a structure in which the light collecting sheets 60A, 60B are disposed between the sag-proof plate 50 and the liquid crystal display panel module 400. At least a portion of the light collecting sheets 60A, 60B facing the display area is provided with a transparent conductive film 70 made of ITO, for example, as antistatic processing. The surfaces of the light collecting sheets 60A, 60B are roughened. Interposition of the light collecting sheets 60A, 60B between the sag-proof plate 50 and the liquid crystal display panel module 400 prevents problems such as Newton's rings caused by contact of the sag-proof plate 50 and the liquid crystal display panel module 400.

To prevent occurrence of optical non-uniformity due to a small separation between the sag-proof plate 50 and the liquid crystal display panel module 400 caused by the contact of the two opposing optically flat surfaces of the sag-proof plate 50 and the liquid crystal display panel module 400, an antiglare treatment may be applied to roughen and make lusterless the surface of the polarizer attached to the liquid crystal display panel module 400 and in contact with the sag-proof plate 50, or the surface of the sag-proof plate 50 may be roughened.

Embodiment 4

Figure 14:
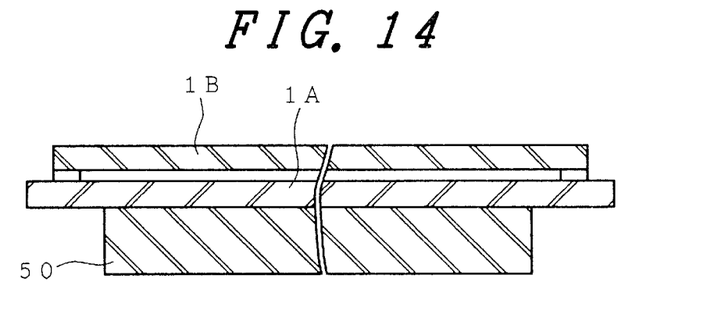
FIG. 14 is a cross-sectional view for explaining another modification of the present invention.

FIG. 14 is a schematic cross-sectional view for explaining a modification improved over the liquid crystal display device of Embodiment 2. FIG. 14 illustrates the liquid crystal display panel module 400 and a sag-proof plate 50 made integral with the liquid crystal display panel module 400. The sag-proof plate 50 is fixed on the display area of the liquid crystal display panel module 400.

This structure reduces the number of components for the module of the liquid crystal display device and care need not be taken to position the sag-proof plate 50 with respect to the liquid crystal display panel module 400 in assembling of the module. For the similar purpose, the sag-proof plate 50 may be formed integral with the light diffusing plate 600. For example, the surface of the sag-proof plate 50 on the side of the backlight unit 300 may be treated such that the surface has a function similar to the light diffusing plate 600.

Embodiment 5

Figure 15:
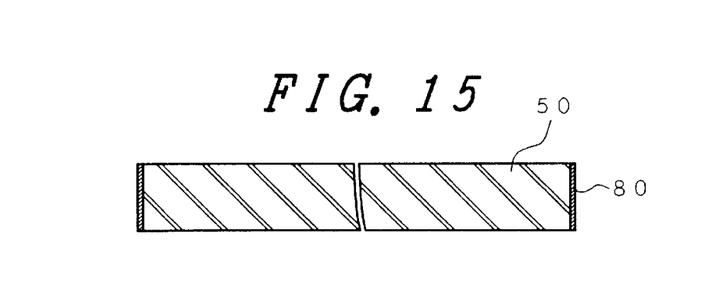
FIG. 15 is a cross-sectional view of another embodiment of a sag-proof plate in the present invention.

FIG. 15 is a cross-sectional view of another embodiment of the sag-proof plate 50 in accordance with present invention. a The sag-proof plate 50 is provided with metal films 80, for example, on its side faces for the purpose of reflecting light.

As an alternative, white tapes or flexible spacers may be attached to the side faces of the sag-proof plate 50. The flexible spacers may be fixed to the side faces of the sag-proof plate 50 with adhesive, or may be disposed on the light-collecting sheets 60A, 60B to be in contact with the side faces of the sag-proof plate 50.

Light from the backlight unit 300 is projected toward the liquid crystal display panel module 400 via the relatively thick sag-proof plate 50. If the above-described light-reflecting means is not disposed at the side faces, light directed toward the side faces of the sag-proof plate 50 does not reach the eyes of the observer and is wasted. In this embodiment, the above-mentioned disadvantage is eliminated and consequently the display area may be increased, although to some degree.

Incidentally, white tapes or spacers provided at the side faces absorb stresses between the sag-proof plate 50 and the inner frame 700 caused by thermal expansion of the sag-proof plate 50 or vibration of the liquid crystal display device during its transportation and consequently prevent deformation of the sag-proof plate 50, and further, they prevent the sag-proof plate 50 being broken, and prevent occurrence of dust from the broken sag-proof plate 50. The white tapes or spacers provided at the side faces prevent foreign particles from going into the gap between the sag-proof plate 50 and the inner frame 700 by filling the gap.

It is preferable that the flexible spacers are white for the purpose of reflecting light, but when the flexible spacers are used in combination with the metal film 80, they need not be white.

Although the above-explained embodiments use the so-called in-plane switching, the present invention is not limited to this, but the present invention is also applicable to the liquid crystal display device of the so-called vertical field type, the twisted nematic type, for instance, because the main difference between the two types is in the structure of pixels, and the other structures are substantially similar.

Incidentally, in the liquid crystal display device of the vertical field type, the transmission of light at each pixel is controlled by a vertical electric field applied across a layer of liquid crystal material sandwiched between opposed transparent electrodes on the inner surfaces of the opposed transparent substrates.

It is apparent from the above explanation that the liquid crystal display device in accordance with present invention is capable of securing the mechanical strength of the lower case without increasing the so-called border areas irrespective of the increased size of the liquid crystal display device, and eliminating occurrence of shading at the peripheries of the display area of the liquid crystal display panel when it is viewed from the observer's side.

What is claimed is:

1. A liquid crystal display device comprising:
a liquid crystal display panel having a liquid crystal layer sandwiched between a pair of upper and lower substrates,
an illuminating light source disposed behind said liquid crystal display panel,
an upper case made of metal having a sidewall bent back from a periphery of a front portion thereof and a window approximately corresponding to a display area of said liquid crystal display panel,
a lower case made of resin for housing said illuminating light source in a recess thereof, and
an inner frame made of metal having an opening approximately corresponding to said display area of said liquid crystal display panel for allowing light from said illuminating light source to be directed toward said liquid crystal display panel, and a sidewall bent back from a periphery of a front portion of said inner frame and extending along a sidewall of said lower case, and interposed between said liquid crystal display panel and said lower case,
said upper case and said lower case being clamped together after stacking said liquid crystal display panel, said inner frame and said illuminating light source in the order named between said upper case and said lower case.

2. A liquid crystal display device according to claim 1, wherein said opening in said inner frame defines an area of said liquid crystal display panel illuminated by said illuminating light source.

3. A liquid crystal display device according to claim 1, wherein said inner frame is provided with a flat portion for seating said liquid crystal display panel thereon.

4. A liquid crystal display device comprising:

a liquid crystal display panel having a liquid crystal layer sandwiched between a pair of upper and lower substrates, an illuminating, light source disposed behind said liquid crystal display panel, an upper case made of metal having a sidewall bent back from a periphery of a front portion thereof and a window approximately corresponding to a display area of said liquid crystal display panel, a lower case made of resin for housing said illuminating light source in a recess thereof, an inner frame made of metal having an opening approximately corresponding to said display area of said liquid crystal display panel for allowing light from said illuminating light source to be directed toward said liquid crystal display panel, and a sidewall bent back from a periphery of a front portion of said inner frame and extending along a sidewall of said lower case, and interposed between said liquid crystal display panel and said lower case, and a transparent plate fitted within said opening in said inner frame, said upper case and said lower case being clamped together after stacking said liquid crystal display panel, said inner frame and said illuminating light source in the order named between said upper case and said lower case.

5. A liquid crystal display device according to claim 4, wherein said transparent plate is in contact with said liquid crystal panel and held by said lower case.

6. A liquid crystal display device according to claim 4, wherein said lower case is provided with a portion for seating said transparent plate thereon.

7. A liquid crystal display device according to claim 4, wherein said transparent plate is positioned in a plane within said opening in said inner frame.

8. A liquid crystal display device according to claim 4, wherein said liquid crystal display device further comprises an antistatic member disposed between said liquid crystal display panel and said transparent plate.

9. A liquid crystal display device according to claim 4, wherein said transparent plate is provided with a transparent conductive film on a surface thereof facing toward said liquid crystal display panel.

10. A liquid crystal display device according to claim 4, wherein said liquid crystal display panel is a device in which an electric field substantially in parallel with said pair of upper and lower substrates is applied selectively to change a light transmissive property, and said transparent plate is provided with antistatic means.

* * * * *